(12) United States Patent
Kurihara et al.

(10) Patent No.: US 11,529,581 B2
(45) Date of Patent: Dec. 20, 2022

(54) FILTER DEVICE

(71) Applicant: SMC CORPORATION, Chiyoda-ku (JP)

(72) Inventors: Mitsuhiro Kurihara, Kashiwa (JP); Kenji Fukushima, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 359 days.

(21) Appl. No.: 16/932,991

(22) Filed: Jul. 20, 2020

(65) Prior Publication Data

US 2021/0023496 A1 Jan. 28, 2021

(30) Foreign Application Priority Data

Jul. 25, 2019 (JP) .............................. JP2019-137314

(51) Int. Cl.
*B01D 45/00* (2006.01)
*B01D 46/42* (2006.01)
*B01D 46/00* (2022.01)
*B01D 46/24* (2006.01)
*B01D 46/58* (2022.01)

(52) U.S. Cl.
CPC ..... *B01D 46/4272* (2013.01); *B01D 46/0008* (2013.01); *B01D 46/2403* (2013.01); *B01D 46/58* (2022.01); *B01D 2273/28* (2013.01); *B01D 2279/51* (2013.01)

(58) Field of Classification Search
CPC ............ B01D 46/4272; B01D 46/0008; B01D 46/2403; B01D 46/58; B01D 2273/28; B01D 2279/51; B01D 2267/30; B01D 2273/16; B01D 46/24; B01D 46/90
See application file for complete search history.

(56) References Cited

U.S. PATENT DOCUMENTS 10,814,264 B2 * 10/2020 Brinkman .............. B01D 46/58
2014/0237962 A1 8/2014 Ginder

FOREIGN PATENT DOCUMENTS

| CA | 2606145 A1 * | 11/2006 | ......... B01D 46/0058 |
| CA | 2951678 A1 * | 3/2012 | ............. A47L 5/362 |
| DE | 101 01 218 A1 | 7/2002 | |
| DE | 102015205480 A1 * | 11/2015 | ........... B01D 46/002 |
| DK | 145983 B * | 5/1983 | ............. B01D 46/58 |
| EP | 2667174 A2 * | 11/2013 | ......... B01D 46/0058 |

(Continued)

OTHER PUBLICATIONS

Extended European Search Report dated Jan. 12, 2021 in European Patent Application No. 20182785.4, 4 pages.

*Primary Examiner* — Dung H Bui
(74) *Attorney, Agent, or Firm* — Oblon, McClelland, Maier & Neustadt, L.L.P.

(57) ABSTRACT

A negative pressure-side flow path having a negative pressure-side filter and a positive pressure-side flow path having a positive pressure-side filter are connected in parallel between a first port and a second port, and a shuttle valve is installed between the negative pressure-side flow path and the positive pressure-side flow path, and the first port, thus when a negative pressure is supplied to the first port, the first port is caused to communicate with the second port through the negative pressure-side flow path, and when a positive pressure is supplied to the first port, the first port is caused to communicate with the second port through the positive pressure-side flow path.

8 Claims, 5 Drawing Sheets

(56) References Cited

FOREIGN PATENT DOCUMENTS

| | | |
|---|---|---|
| JP | 2001-129335 A | 5/2001 |
| JP | 2001-170429 A | 6/2001 |
| JP | 2014-237094 A | 12/2014 |

* cited by examiner

FILTER DEVICE

TECHNICAL FIELD

The present invention relates to a filter device which is installed in a flow path to remove foreign substances, such as dust, contained in a gas which flows through the flow path to which a pressure selectively switched between a negative pressure and a positive pressure is supplied.

BACKGROUND ART

Adsorption transport devices, which adsorb a work with an adsorption pad and transport the work to a predetermined position, are widely used, for instance, when an electronic component, such as a semiconductor chip, is adsorbed and placed on a substrate. In such an adsorption transport device, a work is adsorbed by an adsorption pad supplied with a vacuum pressure (negative pressure) and transported to a predetermined position, and a fluid pressure supplied to the adsorption pad is switched to a vacuum break pressure (positive pressure) at the predetermined position, thus the work is separated from the adsorption pad.

Normally, a flow path connected to the adsorption pad of such an adsorption transport device is provided with a filter device as disclosed in PTL1 and PTL2, for instance. At the time of vacuum pressure supply (at the time of negative pressure supply) and at the time of vacuum break (at the time of positive pressure supply), the filter device removes foreign substances, such as dust, mixed in a gas (air) which flows through the flow path. With such a filter device provided, at the time of negative pressure supply, foreign substances mixed in the air adsorbed by the adsorption pad can be prevented from entering a negative pressure source, thus the negative pressure source can be prevented from being damaged by the foreign substances. In addition, on the other hand, at the time of positive pressure supply, foreign substances mixed in the air from a positive pressure source can be prevented from being discharged from the adsorption pad, thus a work and its surroundings can be prevented from being contaminated with the discharged foreign substances.

Meanwhile, in the above-described adsorption transport device, at the time of negative pressure supply and the time of positive pressure supply, the directions of the flow of air flowing through the flow path are opposite directions. Thus, in the filter device disclosed in PTL1 and PTL2, a flow path for negative pressure, supplied with a negative pressure from a negative pressure source and a flow path for positive pressure, supplied with a positive pressure from a positive pressure source are formed in parallel in the filter device. Then, in the negative pressure-side flow path, a filter for negative pressure, a check valve which allows the flow from the adsorption pad side to the negative pressure source side are connected in series, and in the positive pressure-side flow path, a filter for positive pressure, a check valve which allows the flow from the positive pressure source side to the adsorption pad side are connected in series.

By adopting such a configuration of the filter device, the foreign substances caught by the filter at the time of negative pressure supply can be prevented from being mixed into the air for vacuum break at the time of positive pressure supply and discharged from the vacuum pad, and the foreign substances caught by the filter at the time of positive pressure supply can be prevented from being mixed into the air adsorbed from the adsorption pad at the time of negative pressure supply and adsorbed by the negative pressure source.

However, in the filter device disclosed in PTL1 and PTL2, multiple valve discs (check valves) are needed, and the internal flow path structure tends to be complicated, thus reduction in pressure efficiency and increase in various costs are concern.

CITATION LIST

Patent Literature

[PTL 1] Japanese Unexamined Patent Application Publication No. 2001-170429
[PTL 2] Japanese Unexamined Patent Application Publication No. 2001-129335

SUMMARY OF INVENTION

Technical Problem

The technical challenge of the present invention is to provide a filter device which is to be installed in a flow path and capable of implementing a more simple and logical flow path structure, the flow path being supplied with a pressure selectively switched between a negative pressure and a positive pressure.

Solution to Problem

In order to solve the challenge, the present invention provides a filter device which is installed in a flow path and filters foreign substances from a gas which flows through the flow path to which a pressure selectively switched between a negative pressure and a positive pressure is supplied, the filter device comprising: a first port for selectively switching between and inputting a negative pressure and a positive pressure; a second port for outputting to an outside the negative pressure and the positive pressure inputted from the first port; and a negative pressure-side filter and a positive pressure-side filter which are disposed between the first port and the second port, and connected in parallel to the first and second ports, the negative pressure-side filter has a breathable negative pressure-side filter element to filter foreign substances from a gas which flows from the second port to the first port, and the positive pressure-side filter has a breathable positive pressure-side filter element to filter foreign substances from a gas which flows from the first port to the second port, a shuttle valve is disposed between the first port, and the negative pressure-side and positive pressure-side filters, and the shuttle valve has a valve disc such that when a negative pressure is supplied to the first port, the valve disc opens communication between the first port and the negative pressure-side filter to output the negative pressure from the second port, and simultaneously blocks communication between the first port and the positive pressure-side filter, whereas when a positive pressure is supplied to the first port, the valve disc opens communication between the first port and the positive pressure-side filter to output the positive pressure from the second port, and simultaneously blocks communication between the first port and the negative pressure-side filter.

Here, preferably, the filter device has a negative pressure-side flow path including the negative pressure-side filter and a positive pressure-side flow path including the positive pressure-side filter between the first port and the second port, and one ends of the negative pressure-side flow path and the positive pressure-side flow path communicate with the shuttle valve, and the other ends of the negative pressure-side flow path and the positive pressure-side flow path communicate with the second port. More preferably, a constriction portion is formed on a flow path portion in the positive pressure-side flow path, the flow path portion being closer to the second port than to the positive pressure-side filter element.

In a preferable embodiment of a filter device according to the present invention, the filter device extends along a longitudinal axis, and has a first end and a second end at both ends in an axial direction, the filter device has a filter main body which includes the negative pressure-side and positive pressure-side filters and extends in the axial direction, a first cap section which includes the first port and the shuttle valve, and is detachably attached to an end on a first end side of the filter main body, and a second cap section which includes the second port, and is detachably attached to an end on a second end side of the filter main body, the negative pressure-side and positive pressure-side filters are provided extending in parallel to each other in the axial direction in the filter main body, and both ends of the negative pressure-side and positive pressure-side filters are detachably connected to the first cap section and the second cap section, and thereby ends on a first end side of the negative pressure-side flow path and the positive pressure-side flow path communicate with the shuttle valve, and ends on a second end side of the negative pressure-side flow path and the positive pressure-side flow path communicate with the second port.

Here, preferably, the negative pressure-side filter has the negative pressure-side filter element in a tubular shape extending in the axial direction, a tubular negative pressure-side filter case which inwardly houses the negative pressure-side filter element and forms a negative pressure-side ring-shaped outer flow path on an outer circumferential surface of the negative pressure-side filter element, a negative pressure-side first joint that connects an end on a first end side of the negative pressure-side filter case and the first cap section, and a negative pressure-side second joint that connects an end on a second end side of the negative pressure-side filter case and the second cap section, in the negative pressure-side first joint, a negative pressure-side first flow path is formed, which allows the shuttle valve and an internal flow path of the negative pressure-side filter element to communicate with each other in the negative pressure-side flow path, and in the negative pressure-side second joint, a negative pressure-side second flow path is formed, which allows the negative pressure-side ring-shaped outer flow path and the second port to communicate with each other in the negative pressure-side flow path, the positive pressure-side filter has the positive pressure-side filter element in a tubular shape extending in the axial direction, a tubular positive pressure-side filter case which inwardly houses the positive pressure-side filter element and forms a positive pressure-side ring-shaped outer flow path on an outer circumferential surface of the positive pressure-side filter element, a positive pressure-side first joint that connects an end on a first end side of the positive pressure-side filter case and the first cap section, and a positive pressure-side second joint that connects an end on a second end side of the positive pressure-side filter case and the second cap section, and in the positive pressure-side first joint, a positive pressure-side first flow path is formed, which allows the shuttle valve and the positive pressure-side ring-shaped outer flow path to communicate with each other in the positive pressure-side flow path, and in the positive pressure-side second joint, a positive pressure-side second flow path is formed, which allows an internal flow path of the positive pressure-side filter element and the second port to communicate with each other in the positive pressure-side flow path.

More preferably, a constriction portion is formed in a flow path portion, which is closer to the second port than to the positive pressure-side filter element, in the positive pressure-side flow path by setting an effective cross-sectional area of the positive pressure-side first flow path equal to an effective cross-sectional area of the negative pressure-side second flow path, and an effective cross-sectional area of the positive pressure-side second flow path smaller than an effective cross-sectional area of the negative pressure-side first flow path. In addition, more preferably, the negative pressure-side filter case and the positive pressure-side filter case are formed of a transparent material so that the negative pressure-side filter element and the positive pressure-side filter element are visible from an outside through the negative pressure-side and positive-side filter cases.

Furthermore, more preferably, the shuttle valve has a valve mounting hole which is provided open in the first cap section, a body for flow path formation which is fitted into the valve mounting hole and forms a valve chamber between a leading end and a bottom of the valve mounting hole, and the valve disc disposed in the valve chamber, a first communication flow path, which communicates with the negative pressure-side flow path, is provided open in a portion closer to a bottom than to the valve disc of the valve mounting hole, and a ring-shaped first valve seat is formed on an inner circumferential surface around an opening of the first communication flow path in the valve chamber, the first valve seat being brought into contact with and separated from the valve disc, a second communication flow path, which communicates with the positive pressure-side flow path, is formed at a leading end of the body for flow path formation, and a ring-shaped second valve seat is formed around an opening of the second communication flow path, the second valve seat being brought into contact with and separated from the valve disc, the first port communicates with a sectional part closer to the second valve seat than to the valve disc in the valve chamber, and when a negative pressure is applied to the first port, the valve disc is separated from the first valve seat and is seated on the second valve seat, and when a positive pressure is applied to the first port, the valve disc is seated on the first valve seat and is separated from the second valve seat.

Advantageous Effects of Invention

In the filter device according to the present invention, when a pressure inputted to the first port is selectively switched to a negative pressure or a positive pressure, switching between filters for removing foreign substances from a gas which flows in the filter device is made by a shuttle valve which switches between flow paths with a single valve disc. Thus, it is possible to provide a filter device having a more simple and logical flow path structure.

DESCRIPTION OF EMBODIMENTS

Figure 1:
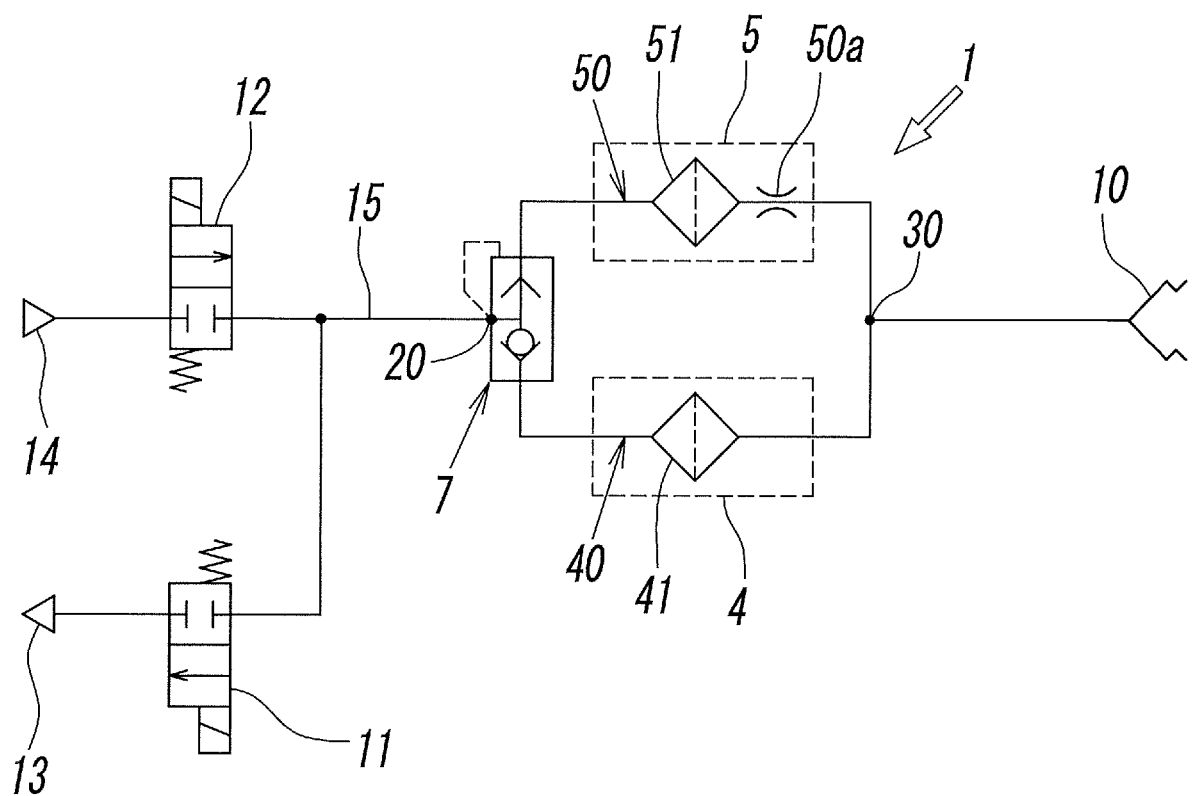
FIG. 1 is a circuit diagram illustrating an application example of a filter device according to the present invention.

For instance, as illustrated in FIG. 1, a filter device 1 according to the present invention is used in an adsorption transport device or the like which adsorbs a work with an adsorption pad 10 and transports the work to a predetermined position. A negative pressure source 13 and a positive pressure source 14 are selectively switched by electromagnetic pilot switching valves 11, 12 to communicate with a flow path 15, and the filter device 1 is installed in the flow path 15 for filtering a gas, such as air, which flows through the flow path 15. Here, as the negative pressure-side source 13, a vacuum pressure generating device (such as an ejector device) may be used, which supplies a pressure lower than the atmospheric pressure, and as the positive pressure-side source 14, a compressor or the like may be used, which supplies a pressure higher than the atmospheric pressure.

In this manner, the filter device 1 is installed in the flow path 15 to which a pressure is supplied from the negative pressure-side source 13 and the positive pressure-side source 14, the pressure being selectively switched between a negative pressure and a positive pressure, thus when a negative pressure is supplied to the flow path 15 from the negative pressure source 13, foreign substances such as dust are filtered (removed) from a gas, such as air, adsorbed from a fluid pressure device such as the adsorption pad 10, and the foreign substances can be prevented from entering the negative pressure source 13. On the other hand, when a positive pressure for vacuum break is supplied to the flow path 15 from the positive pressure source 14, foreign substances such as dust are filtered (removed) from a gas, such as air with a positive pressure supplied from the positive pressure source 14, and a work and its surroundings can be prevented from being contaminated with the foreign substances.

The filter device 1 has a first port 20 for establishing communication by selectively switching between the negative pressure source 13 and the positive pressure source 14 by the switching valves 11, 12; and a second port 30 for outputting the negative pressure and the positive pressure, inputted from the first port 20, to an external fluid pressure device such as the adsorption pad 10. In addition, between the first port 20 and the second port 30, a negative pressure-side flow path 40 having a negative pressure-side filter 4 and a positive pressure-side flow path 50 having a positive pressure-side filter 5 are provided, and the negative pressure-side flow path 40 and the positive pressure-side flow path 50 are connected in parallel to the first and second ports 20, 30.

Figure 2:
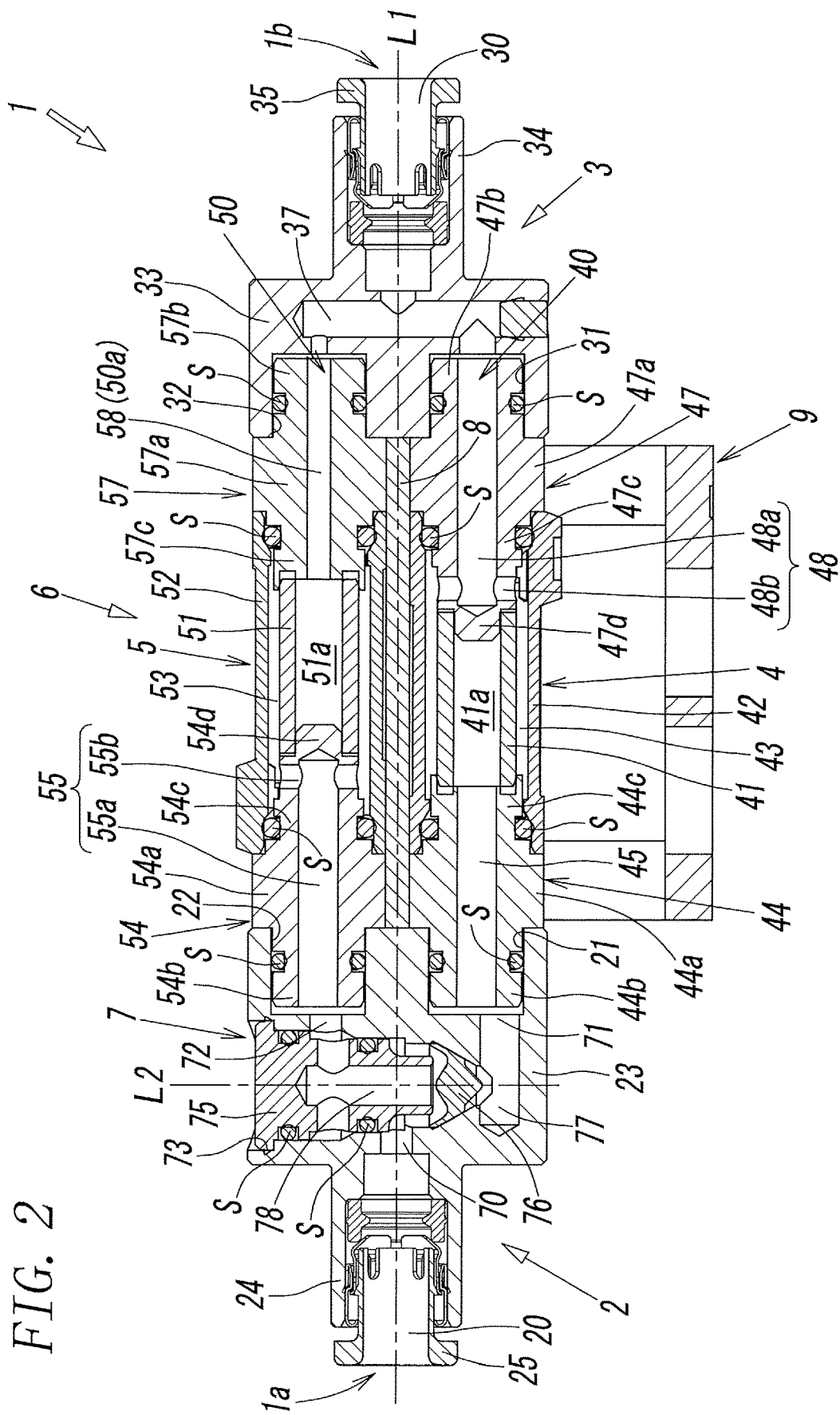
FIG. 2 is a cross-sectional view of the filter device according to the present invention.
Figure 5A:
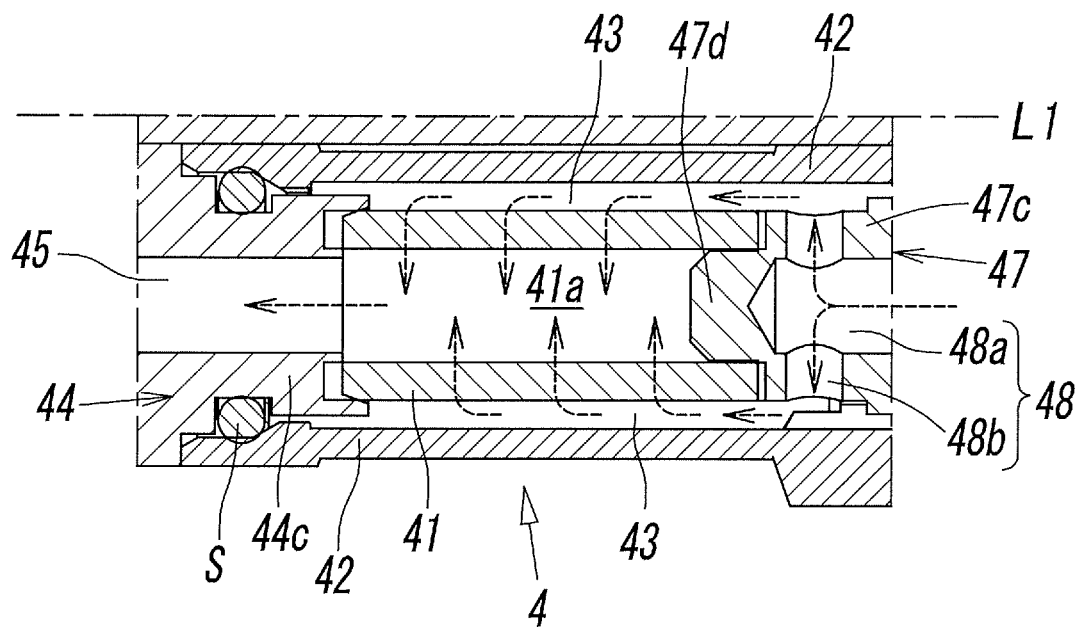
FIG. 5A is an enlarged view of negative pressure-side and positive pressure-side filters in FIG. 2, showing the fluid flow in the negative pressure-side filter 4 when a negative pressure is supplied to the first port.
Figure 5B:
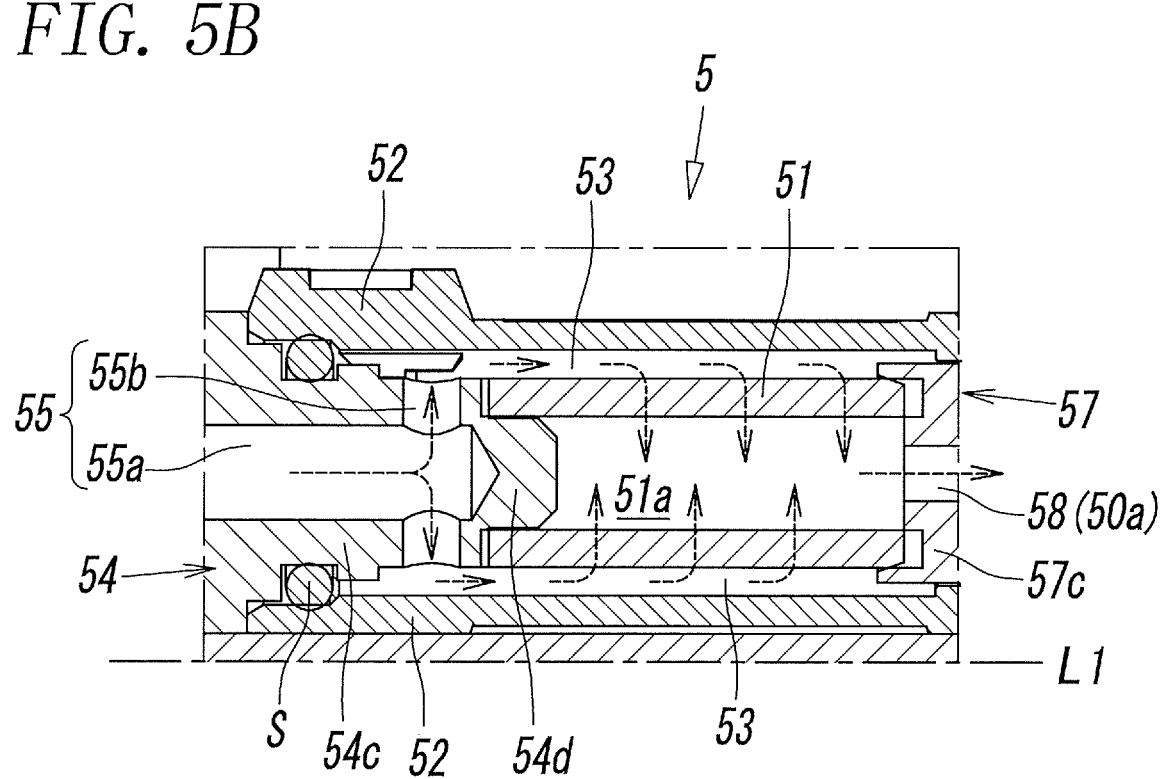
FIG. 5B is an enlarged view of negative pressure-side and positive pressure-side filters in FIG. 2, showing the fluid flow in the positive pressure-side filter 5 when a positive pressure is supplied to the first port.

As illustrated in FIG. 2, FIG. 5A, and FIG. 5B, the negative pressure-side filter 4 has a breathable negative pressure-side filter element 41, and when a negative pressure is inputted from the first port 20, foreign substances are removed by the negative pressure-side filter element 41 from a gas which flows from the second port 30 to the first port 20 through the negative pressure-side flow path 40. In contrast, the positive pressure-side filter 5 has a breathable positive pressure-side filter element 51, and when a positive pressure is inputted from the first port 20, foreign substances are removed by the positive pressure-side filter element 51 from a gas which flows from the first port 20 to the second port 30 through the positive pressure-side flow path 50.

In order to implement such functions, in the filter device 1, a shuttle valve 7 is disposed between the first port 20, and the negative pressure-side flow path 40 and the positive pressure-side flow path 50. Specifically, one ends of the negative pressure-side flow path 40 and the positive pressure-side flow path 50 are connected to the first port 20 through the shuttle valve 7, and the other ends of the flow paths 40, 50 are directly connected to the second port 30. In this manner, when a negative pressure is supplied to the first port 20, communication between the first port 20 and the negative pressure-side flow path 40 is open, and the negative pressure is outputted from the second port 30, and at the same time, communication between the first port 20 and the positive pressure-side flow path 50 is blocked. In this process, the gas flown into the filter device 1 from the second port 30 is filtered by the filter element 41 of the negative pressure-side filter 4, then is flown out from the first port 20.

On the other hand, when a positive pressure is supplied to the first port 20, communication between the first port 20 and the positive pressure-side flow path 50 is open, and the positive pressure is outputted from the second port 30, and at the same time, communication between the first port 20 and the negative pressure-side flow path 40 is blocked. In this process, the gas flown into the filter device 1 from the first port 20 is filtered by the filter element 51 of the positive pressure-side filter 5, then is flown out from the second port 30.

Also, in the filter device 1 according to the embodiment, a constriction portion 50a is provided in a flow path portion in the positive pressure-side flow path 50, the flow path portion being closer to the second port 30 than to the positive pressure-side filter element 51. By providing such constriction portion 50a in the positive pressure-side flow path 50, particularly when the pressure of a gas to be supplied to the first port 20 of the filter device 1 is switched to a negative pressure, the responsiveness of the shuttle valve 7, which switches the communication with the first port 20 to the negative pressure-side flow path 40, can be improved. In addition, by providing the constriction portion 50a closer to the second port 30 than to the positive pressure-side filter element 51, return of foreign substances back to the first port 20 can be reduced as much as possible, the foreign substances being caught by the positive pressure-side filter element 51 upon supply of a positive pressure to the first port 20.

The structure of the filter device 1 will be described more specifically using FIG. 2 and FIG. 3. The filter device 1 extends in a first axis L1 longitudinal direction, and has a first end 1a and a second end 1b at both ends in the axis L1 direction. And, the filter device 1 has a filter main body 6 which includes the negative pressure-side and positive pressure-side filters 4, 5 and extends in the axis L1 direction; a first cap section 2 which includes the first port 20 and the shuttle valve 7, and is detachably attached to the end on a first end side of the filter main body 6; and a second cap section 3 which includes the second port 30, and is detachably attached to the end on a second end side of the filter main body 6. Also, a symbol 9 in Figures illustrates a bracket for fixing the filter device 1 to a predetermined position, and is detachably attached from the lateral side of the filter main body.

The filter main body 6 has the negative pressure-side filter 4 which forms the negative pressure-side flow path 40; the positive pressure-side filter 5 which forms the positive pressure-side flow path 50; and a holder 8 that holds the negative pressure-side and positive pressure-side filters 4, 5 in parallel to each other in the first axis L1 direction. In short, the negative pressure-side flow path 40 and the positive pressure-side flow path 50 extend in parallel to each other in the first axis L1 direction. And both ends of the negative pressure-side and positive pressure-side filters 4, 5 in the first axis L1 direction are detachably attached to the first cap section 2 and the second cap section 3. As a consequences, the ends on the first end 1a side of the negative pressure-side flow path 40 and the positive pressure-side flow path 50 communicate with the shuttle valve 7, and the ends on the second end 1b side of the negative pressure-side flow path 40 and the positive pressure-side flow path 50 are connected to the second port 30.

The negative pressure-side and positive pressure-side filters 4, 5 have the same structure to each other except that the filters 4, 5 are disposed in opposite directions to each other in the first axis L1 direction, and the positive pressure-side filter 5 is provided with the constriction portion 50a, whereas the negative pressure-side filter 4 is provided with no constriction portion. The negative pressure-side and positive pressure-side filters 4, 5 have negative pressure-side and positive pressure-side filter elements 41, 51 which are formed in a tubular hollow shape extending in the axial direction; and negative pressure-side and positive pressure-side filter cases 42, 52 which are formed in a tubular hollow shape extending in the axial direction, and inwardly house the filter elements 41, 51. A negative pressure-side inside flow path 41a and a positive pressure-side inside flow path 51a penetrating in the first axis L1 direction are formed in the filter elements 41, 51.

Also, the inner diameters of the filter cases 42, 52 are formed to be larger than the outer diameters of the filter elements 41, 51, and the entire filter elements 41, 51 are coaxially housed in the filter cases 42, 52. Thus, a negative pressure-side ring-shaped outer flow path 43 is formed on the outer circumferential surface (that is, between the outer circumferential surface of the filter element 41 and the inner circumferential surface of the negative pressure-side filter case 42) of the negative pressure-side filter element 41. In contrast, a positive pressure-side ring-shaped outer flow path 53 is formed on the outer circumferential surface (that is, between the outer circumferential surface of the filter element 51 and the inner circumferential surface of the positive pressure-side filter case 52) of the positive pressure-side filter element 51.

Here, these filter cases 42, 52 are formed of a transparent material, such as a transparent resin. Use of the transparent filter cases 42, 52 allows the state (such as a degree of dirtiness) of the filter elements 41, 51 to be visually recognized from the outside of the outer circumferential surface of the filter elements 41, 51. In addition, the negative pressure-side filter element 41 and the filter case 42, and the positive pressure-side filter element 51 and the filter case 52 have the same structure to each other except that the filter elements and the filter cases are disposed in the opposite directions to each other in the first axis L1 direction.

The negative pressure-side filter 4 has a negative pressure-side first joint 44 at the end on the first end 1a side of the negative pressure-side filter case 42, the negative pressure-side first joint 44 being used for connection to the first cap section 2. Similarly, the negative pressure-side filter 4 has a negative pressure-side second joint 47 at the end on the second end 1b side, the negative pressure-side second joint 47 being used for connection to the second cap section 3.

The negative pressure-side first joint 44 is integrally formed by a large diameter main body 44a arranged at a central portion in the first axis L1 direction; a small diameter connection portion 44b provided to project from the first end 1a side of the main body 44a; and a small diameter fitting portion 44c provided to project from the second end 1b side of the main body 44a.

In the negative pressure-side first joint 44, a negative pressure-side first flow path 45 is formed, which allows the later-described second valve opening 71 of the shuttle valve 7 provided in the first cap section 2 and the inside flow path 41a of the negative pressure-side filter element 41 to communicate with each other. The negative pressure-side first flow path 45 penetrates the negative pressure-side first joint 44 linearly long the first axis L1 from the end face of the connection portion 44b to the end face of the fitting portion 44c, and forms the end on the first end 1a side of the negative pressure-side flow path 40.

In addition, the outer circumferences of the connection portion 44b and the fitting portion 44c are each provided with a ring-shaped seal member S. The connection portion 44b is detachably hermetically fitted with a negative pressure-side fitting recess 21 which is provided with the second valve opening 71 of the first cap section 2. In contrast, the fitting portion 44c is detachably hermetically fitted with the end on the first end 1a side of the negative pressure-side filter case 42.

The negative pressure-side second joint 47 is integrally formed by a large diameter main body 47a arranged at a central portion in the first axis L1 direction; a small diameter connection portion 47b provided to project from the second end 1b side of the main body 47a; a small diameter fitting portion 47c provided to project from the first end 1a side of the main body 47a; and a fitting projection 47d provided to further project from the first end 1a side of the fitting portion 47c and is smaller in diameter than the fitting portion 47c.

In the negative pressure-side second joint 47, a negative pressure-side second flow path 48 is formed, which allows the later-described connection flow path 37 connected to the second port 30 of the second cap section 3 and the negative pressure-side ring-shaped outer flow path 43 to communicate with each other. Here, the negative pressure-side second flow path 48 is formed by an axial flow path portion 48a linearly provided along the first axis L1 from the end face of the connection portion 47b up to the fitting portion 47c (specifically, up to the boundary portion between the fitting portion 47c and the fitting projection 47d); and a radial flow path portion 48b which radially penetrates the fitting portion 47c and perpendicularly intersects the axial flow path portion 48a. Then, the axial flow path portion 48a and the negative pressure-side ring-shaped outer flow path 43 are connected to each other by the radial flow path portion 48b. The negative pressure-side second flow path 48 forms the end on the second end 1b side of the negative pressure-side flow path 40.

In addition, the outer circumferences of the connection portion 47b and the fitting portion 47c are also each provided with the ring-shaped seal member S. The connection portion 47b is detachably hermetically fitted with a negative pressure-side fitting recess 31 which communicates with the connection flow path 37 of the second cap section 3. In contrast, the fitting portion 44c is hermetically fitted with the end on the second end 1b side of the positive pressure-side filter case 42, and in addition, the fitting projection 47d is fitted with an opening on the second end 1b side of the inside flow path 41a of the negative pressure-side filter element 41 to close the opening. Here, in the fitting portion 47c, the seal member S is disposed at a position closer to the main body 47a than to the radial flow path portion 48b.

Meanwhile, the positive pressure-side filter 5 has a positive pressure-side first joint 54 at the end on the first end 1a side of the positive pressure-side filter case 52, the positive pressure-side first joint 54 being used for connection to the first cap section 2. Similarly, the positive pressure-side filter 5 has a positive pressure-side second joint 57 used for connection to the second cap section 3, at the end on the second end 1b side.

The positive pressure-side first joint 54 is integrally formed by a large diameter main body 54a arranged at a central portion in the first axis L1 direction; a small diameter connection portion 54b provided to project from the first end 1a side of the main body 54a; a small diameter fitting portion 54c provided to project from the second end 1b side of the main body 54a; and a fitting projection 54d provided to further project from the second end 1b side of the fitting portion 54c and is smaller in diameter than the fitting portion 54c. Here, the positive pressure-side first joint 54 and the negative pressure-side second joint 47 have the same structure to each other except that the first and second joints 54, 47 are disposed in the opposite directions to each other in the first axis L1 direction.

In the positive pressure-side first joint 54, a positive pressure-side first flow path 55 is formed, which allows the later-described third opening 72 of the shuttle valve 7 provided in the first cap section 2 and the positive pressure-side ring-shaped outer flow path 53 to communicate with each other. Here, the positive pressure-side first flow path 55 is formed by an axial flow path portion 55a linearly provided along the first axis L1 from the end face of the connection portion 54b up to the fitting portion 54c (specifically, up to the boundary portion between the fitting portion 54c and the fitting projection 54d); and a radial flow path portion 55b which radially penetrates the fitting portion 54c and perpendicularly intersects the axial flow path portion 55a. Then, the axial flow path portion 55a and the positive pressure-side ring-shaped outer flow path 53 are connected to each other by the radial flow path portion 55b. The positive pressure-side first flow path 55 forms the end on the first end 1a side of the positive pressure-side flow path 50.

In addition, the outer circumferences of the connection portion 54b and the fitting portion 54c are each provided with the ring-shaped seal member S. The connection portion 54b is detachably hermetically fitted with a positive pressure-side fitting recess 22 which is provided with the third valve opening 72 of the first cap section 2. In contrast, the fitting portion 54c is hermetically fitted with the end on the first end 1a side of the positive pressure-side filter case 52, and in addition, the fitting projection 54d is fitted with an opening on the first end 1a side of the inside flow path 51a of the positive pressure-side filter element 51 to close the opening. Here, in the fitting portion 54c, the seal member S is disposed at a position closer to the main body 57a than to the radial flow path portion 55b.

The positive pressure-side second joint 57 is integrally formed by a large diameter main body 57a arranged at a central portion in the first axis L1 direction; a small diameter connection portion 57b provided to project from the second end 1b side of the main body 57a; and a small diameter fitting portion 57c provided to project from the first end 1a side of the main body 57a.

In the positive pressure-side second joint 57, a positive pressure-side second flow path 58 is formed, which allows the connection flow path 37 connected to the second port 30 of the second cap section 3 and the inside flow path 51a of the positive pressure-side filter element 51 to communicate with each other. The positive pressure-side second flow path 58 penetrates the positive pressure-side second joint 57 linearly long the first axis L1 from the end face of the connection portion 57b to the end face of the fitting portion 57c, and forms the end on the second end 1b side of the positive pressure-side flow path 50.

In addition, the outer circumferences of the connection portion 57b and the fitting portion 57c are also each provided with the ring-shaped seal member S. The connection portion 57b is hermetically fitted with a positive pressure-side fitting recess 32 which communicates with the connection flow path 37 of the second cap section 3. In contrast, the fitting portion 57c is hermetically fitted with the end on the second end 1b side of the positive pressure-side filter case 52.

Here, the positive pressure-side second joint 57 and the negative pressure-side first joint 44 have the same structure to each other except that the first and second joints 57, 44 are disposed in the opposite directions to each other in the first axis L1 direction, and the diameter of the positive pressure-side second flow path 58 is formed to be smaller than the diameter of the negative pressure-side first flow path 45.

In this manner, in the present embodiment, the effective cross-sectional area of the positive pressure-side first flow path 55 is set to be equal to the effective cross-sectional area of the negative pressure-side second flow path 48, and the diameter (effective cross-sectional area) of the positive pressure-side second flow path 58 is set to be smaller than the diameter (effective cross-sectional area) of the negative pressure-side first flow path 45. As a consequence, the constriction portion 50a is formed by the positive pressure-side second flow path 58. In other words, the combined effective cross-sectional area of the positive pressure-side filter 5 (that is, the combined effective cross-sectional area of the positive pressure-side flow path 50) is set to be smaller than the combined effective cross-sectional area of the negative pressure-side filter 4 (that is, the combined effective cross-sectional area of the negative pressure-side flow path 40).

The holder 8 is formed in a cylindrical shape extending in the first axis L1 direction, and has a first fitting groove 8a and a second fitting groove 8b for fitting and holding the negative pressure-side filter 4 and the positive pressure-side filter 5. The first and second fitting grooves 8a, 8b have openings at both radial ends of the holder 8, and linearly penetrate between the end face on the first end 1a side and the end face on the second end 1b side of the holder 8. At this point, the cross sections of these fitting grooves 8a, 8b are formed as a sector with a central angle of 180 degrees or greater. That is, the opening widths of the first and second fitting grooves 8a, 8b provided on the outer circumference of the holder 8 along the first axis L1 are smaller than the diameters of the fitting grooves 8a, 8b.

Also, the length of the holder 8 in the first axis L1 direction is substantially equal to the length of the filters 4, 5 excluding the connection portions 44b, 47b, 54b, 57b provided at both ends in the axis L1 direction. The ends on the first end 1a side and the second end 1b side of the outer circumferential surface of the holder 8 are concavely provided with first and second engagement grooves 8c, 8d in a circumferential direction around the axis L1 to engage with the later-described first and second grip sections 91, 92 of the bracket 9.

The first cap section 2 is integrally formed by a cylindrical cap main body 23 extending in the first axis L1 direction; and a tubular projection 24 provided upright in the axis L1 direction from the central portion of the end face on the first end 1a side of the main body 23. The end face on the second end 1b side of the cap main body 23 is provided with the negative pressure-side and positive pressure-side fitting recesses 21, 22 for detachably fitting with the connection portions 44b, 54b on the first end 1a side of the negative pressure-side and positive pressure-side filters 4, 5. A quick joint 25 is fitted with the tubular projection 24 to form the first port 20, and a first valve opening 70 is provided to connect the first port 20 to the shuttle valve 7 in the cap main body 23.

Figure 4A:
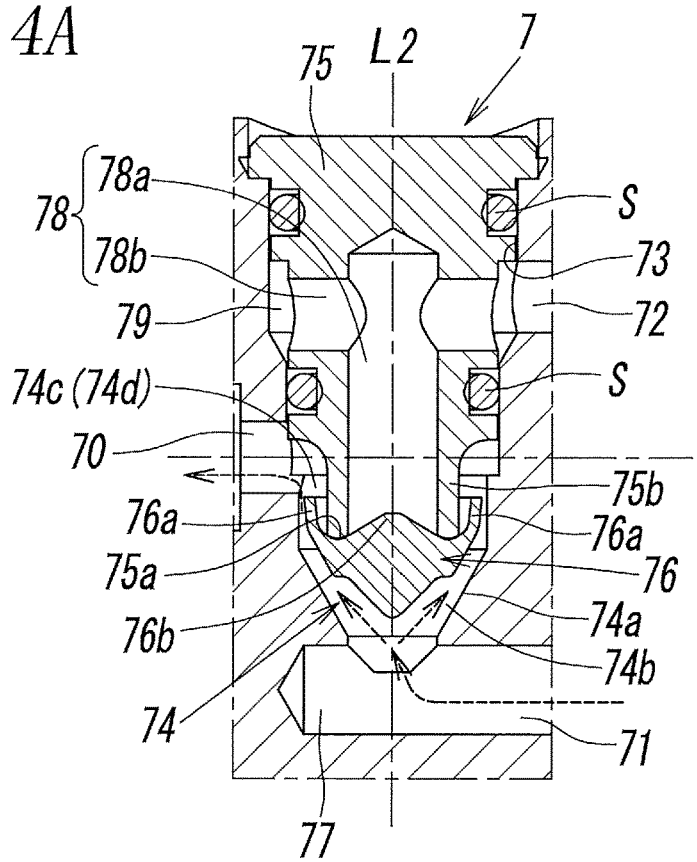
FIG. 4A is an enlarged view illustrating the operation of a shuttle valve in FIG. 2 when a negative pressure is supplied to a first port.
Figure 4B:
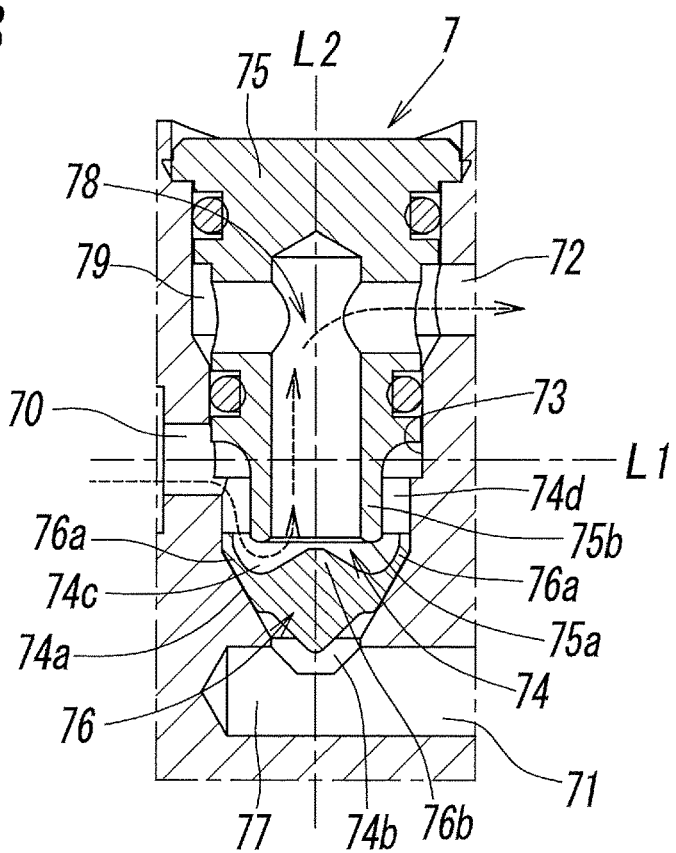
FIG. 4B is an enlarged view illustrating the operation of a shuttle valve in FIG. 2 when a positive pressure is supplied to the first port.

As illustrated in FIG. 2, FIG. 4A, and FIG. 4B, the shuttle valve 7 has a valve mounting hole 73 provided through the cap main body 23 of the first cap section 2; a body 75 for flow path formation which is fitted into the valve mounting hole 73 to form a valve chamber 74 inside the valve mounting hole 73; a single valve disc 76 housed in valve chamber 74 in a freely reciprocating manner; and the first valve opening 70, the second valve opening 71, and the third valve opening 72 for letting gas in and out of the shuttle valve 7. A pressure difference between the gases supplied to these valve openings causes the valve disc 76 to operate, thereby making it possible to switch between the communication states of the valve openings.

The valve mounting hole 73 is formed to be open to the outer circumferential surface, around the first axis L1, of the cap main body 23, to extend in a second axis L2 direction perpendicular to the first axis L1, and to have a gradually smaller diameter toward the bottom.

The body 75 for flow path formation is formed to have a length shorter than the depth of the valve mounting hole 73 in the second axis L2 direction. Thus, the valve chamber 74 is formed between the leading end of the body 75 and the valve mounting hole 73. The side wall (inner circumferential surface), around the second axis L2, of the valve chamber 74 is formed in a conical surface shape in which the diameter is smoothly reduced linearly in a bottom direction of the valve mounting hole 73, and a ring-shaped first valve seat 74a, which is brought into contact with and separated from the valve disc 76, is formed by the side wall in a conical shape. Then, the bottom (that is, the bottom of the valve mounting hole 73) of the valve chamber 74 is connected to a first communication flow path 77 having the second valve opening 71. That is, the first valve seat 74a is formed on the inner circumferential surface around the opening of the first communication flow path 77 in the valve chamber 74.

In the body 75 for flow path formation, a second communication flow path 78 is formed, which allows the valve chamber 74 and the third valve opening 72 to communicate with each other, and the leading end of the body 75 is provided with a tubular opening 75b which forms an opening of the second communication flow path 78 for the valve chamber 74. Then, a ring-shaped second valve seat 75a, which is brought into contact with and separated from the valve disc 76, is formed at the leading end (that is, the leading end of the body 75 for flow path formation) of the tubular opening 75b, around the opening of the second communication flow path 78.

The second communication flow path 78 is formed by an axial flow path portion 78a linearly extending along the second axis L2 from the leading end of the body 75 for flow path formation to the base end side; and a radial flow path portion 78b which penetrates the body 75 in the radial direction and perpendicularly intersects the axial flow path portion 78a. Also, both ends of the radial flow path portion 78b are open to a ring-shaped flow path 79 formed between the body 75 for flow path formation and the valve mounting hole 73, and communicate with the third valve opening 72 through the ring-shaped flow path 79. At this point, both ends of the ring-shaped flow path 79 in the second axis L2 direction are provided with the seal members S, S, and thus the portion between the body 75 for flow path formation and the valve mounting hole 73 is hermetically sealed.

The valve disc 76 is disposed in a freely reciprocating manner relative to the second axis L2 direction between the opening of the first communication flow path 77 in the valve chamber 74 and the opening (that is, the second valve seat 75a) of the second communication flow path 78. That is, the valve chamber 74 is partitioned by the valve disc 76 into a section (first chamber) 74b connected to the first communication flow path 77 and a section (second chamber) 74c where the second valve seat is disposed. The valve disc 76 is integrally formed by a ring-shaped check valve 76a which is formed in a lip shape and brought into contact with and separated from the first valve seat 74a; and a poppet valve 76b which is brought into contact with and separated from the second valve seat 75a.

More specifically described, the valve disc 76 is integrally molded by a resin material having rubber elasticity. The poppet valve 76b is disposed on the second axis L2, and a central portion of the surface (that is, the surface brought into contact with and separated from the second valve seat 75a) on the second chamber 74c side of the poppet valve 76b bulges toward the second chamber 74c. Also, the check valve 76a is formed in a conical tubular shape which expands along the first valve seat 74a from the outer circumferential portion around the second axis L2 in the poppet valve 76b to the second chamber 74c side. The check valve 76a allows the flow of a gas from the first chamber 74b side to the second chamber 74c side (see FIG. 4A), while blocking the flow of a gas from the second chamber 74c side to the first chamber 74b side (see FIG. 4B).

In addition, the second chamber 74c of the valve chamber 74 includes a ring-shaped gap 74d formed between the outer circumferential surface of the tubular opening 75b and the side wall surface of the valve mounting hole 73. The ring-shaped gap 74d is connected to the first valve opening 70 so that a pressure inputted to the first port 20 is supplied from the gap 74d to the valve chamber 74. Also, as illustrated in FIG. 4A, in a state where the poppet valve 76b of the valve disc 76 is seated on the second valve seat 75a, the check valve 76a separated from the first valve seat 74a is configured to be housed in the gap 74c1.

Similarly to the first cap section 2, the second cap section 3 is also integrally formed by a cylindrical cap main body 33 extending in the first axis L1 direction; and a tubular projection 34 provided upright in the axis L1 direction from the central portion of the end face on the second end 113 side of the main body 33. The end face on the first end 1a side of the cap main body 33 is provided with the negative pressure-side and positive pressure-side fitting recesses 31, 32 for detachably fitting with the connection portions 47b, 57b on the second end 1b side of the negative pressure-side and positive pressure-side filters 4, 5. A quick joint 35 is fitted into the tubular projection 34 to form the second port 30.

The second cap section 3 has the connection flow path 37 extending in parallel to the second axis L2, inside the cap main body 33. One end of the connection flow path is connected to the negative pressure-side filter 4, and the other end is connected to the positive pressure-side filter 5. Then, the central portion of the connection flow path is connected to the second port 30. In other words, the negative pressure-side filter 4 and the positive pressure-side filter 5 are always in a state of communicating with the second port 30.

It is to be noted that in order to connect the filter main body 6 to the first cap section 2 and the second cap section 3 together, it is sufficient that a pair of fixing holes 8e, 8e provided through the holder 8 of the filer main body 6, a pair of fixing holes 26, 26 provided through the first cap section 2, and a pair of fixing holes 36, 36 provided through the second cap section 3 be detachably tightened together by inserting a pair of tie-rods which are not illustrated.

Figure 3:
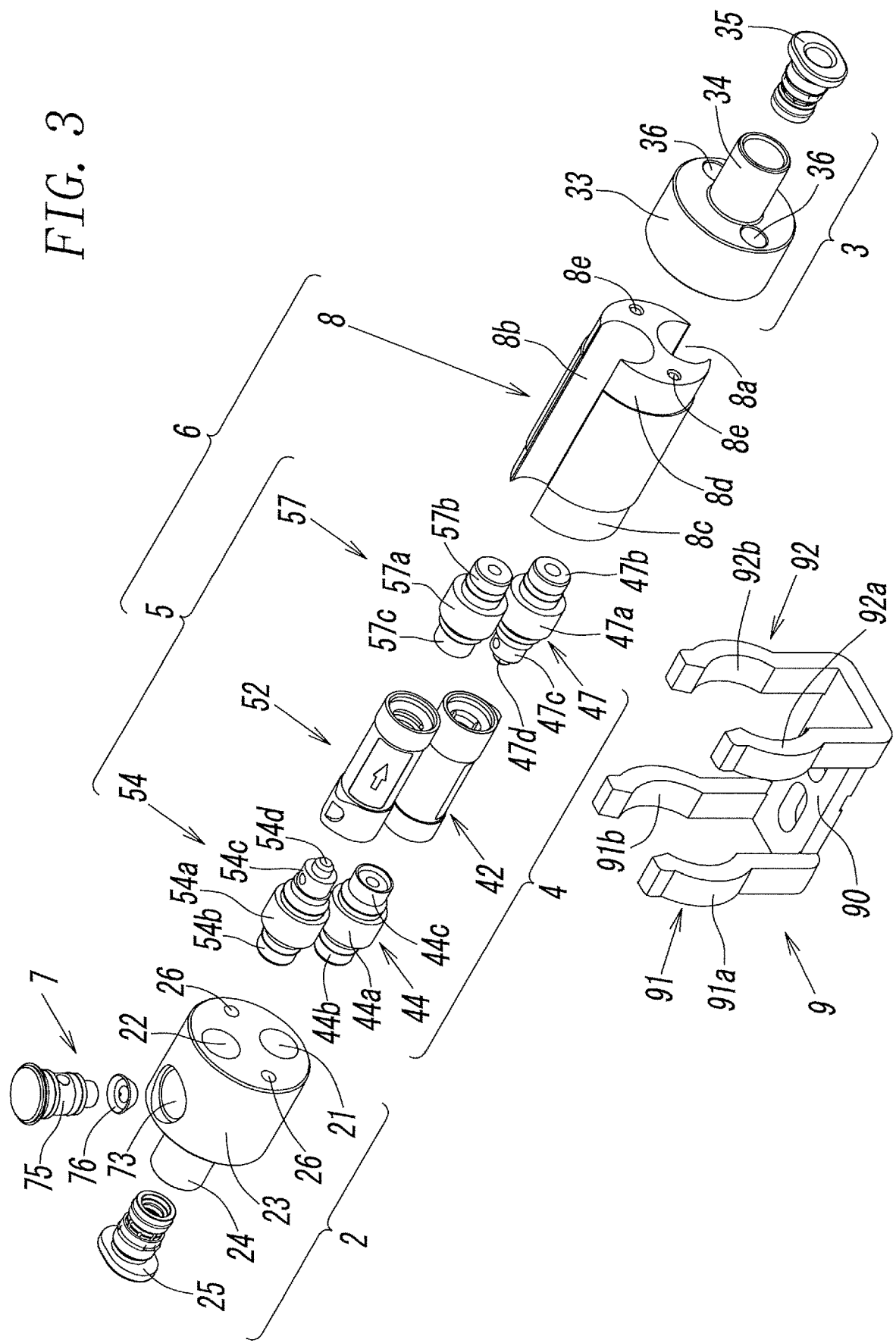
FIG. 3 is an exploded perspective view of the filter device according to the present invention.

The bracket 9 is for detachably mounting the filter device 1 to a predetermined position, and as illustrated in FIG. 3, the bracket 9 has a plate 90 for fixation for fixing the bracket 9 to a predetermined position; and first and second grip sections 91, 92 for gripping the holder 8, which are integrally provided upright from one side of the plate 90 for fixation. The plate 90 for fixation is formed in an elongated rectangular shape in the first axis L1 direction, the end on the first end 1a side is provided with the first grip section 91, and the end on the second end 1b side is provided with the second grip section 92.

The first grip section 91 has a pair of first grip arms 91a, 91b provided upright from both ends of the plate 90 for fixation in a short width direction, and similarly, the second grip section 92 has a pair of second grip arms 92a, 92b. The pair of first grip arms 91a, 91b are engaged with the first engagement groove 8c of the holder 8, and the first grip section 91 holds the end on the first end 1a side of the holder 8, and similarly, the second grip arms 92a, 92b are engaged with the second engagement groove 8d of the holder 8, and the second grip section 92 holds the end on the second end 1b side of the holder 8.

Next, the functional effect of the filter device 1 having the above-described structure will be described.

First, in FIG. 2, when a negative pressure is inputted from the negative pressure source 13 to the first port 20 of the filer device 1, as illustrated in FIG. 4A, a negative pressure is supplied to the second chamber 74c of the valve chamber 74 through the first valve opening 70. Then, the pressure on the first chamber 74b side becomes higher than the pressure on the second chamber 74c side, and the check valve 76a of the valve disc 76 is separated from the first valve seat 74a as well as the poppet valve 76b is seated on the second valve seat 75a. At this point, since the constriction portion 50a is formed by the positive pressure-side second flow path 58 of the positive pressure-side filter, rise of the negative pressure in the second chamber 74c is quick, and thus the responsiveness of the shuttle valve 7 can be improved. In this state, the first valve opening 70 and the second valve opening 71 of the shuttle valve 7 communicate with each other, and the first port 20 communicates with the second port 30 through the negative pressure-side filter 4, thus a negative pressure is outputted from the second port 30.

As a consequence, a gas (such as air) adsorbed by the adsorption pad 10 of FIG. 1 flows from the second port 30 into the negative pressure-side filer 4 through the connection flow path 37 in the second cap section 3, and as illustrated in FIG. 5A, in the negative pressure-side filer 4, the gas is introduced to the negative pressure-side ring-shaped outer flow path 43 through the negative pressure-side second flow path 48 of the negative pressure-side second joint 47, and subsequently, is filtered by the negative pressure-side filter element 41, and introduced to the inside flow path 41a. Furthermore, the gas after being filtered sequentially passes the negative pressure-side first flow path 45 of the negative pressure-side first joint 44, and the second valve opening 71 and the first valve opening 70 of the shuttle valve 7, and flows out from the first port 20 to the negative pressure source 13. In this manner, foreign substances, such as dust, mixed in the gas adsorbed by the adsorption pad 10 are removed by the negative pressure-side filter element 41, thus entry of the foreign substances into the negative pressure source 13 can be prevented.

Conversely, in FIG. 1, when a positive pressure for vacuum break is inputted from the positive pressure source 14 to the first port 20 of the filter device 1, specifically, when a compressed gas (such as compressed air) is introduced, as in FIG. 4B, the compressed gas flows into the second chamber 74c of the valve chamber 74 through the first valve opening 70. Then, the pressure on the second chamber 74c side becomes higher than the pressure on the first chamber 74b side, and the poppet valve 76b of the valve disc 76 is separated from the second valve seat 75a as well as the check valve 76a is seated on the first valve seat 74a. In this state, the first valve opening 70 and the third valve opening 72 of the shuttle valve 7 communicate with each other, and thus the first port 20 communicates with the second port 30 through the positive pressure-side filter 5.

Then, the compressed gas introduced from the first port 20 flows into the positive pressure-side filter 5 through the shuttle valve 7, and as illustrated in FIG. 5B, in the positive pressure-side filter 5, the gas is introduced to the positive pressure-side ring-shaped outer flow path 53 through the positive pressure-side first flow path 55 of the positive pressure-side first joint 54, and subsequently, is filtered by the positive pressure-side filter element 51, and introduced to the inside flow path 51a. In addition, the gas after being filtered sequentially passes the positive pressure-side second flow path 58 of the positive pressure-side second joint 57, and the connection flow path 37 in the second cap section 3, then flows out from the second port 30 to the adsorption pad 10, and breaks the vacuum in the adsorption pad 10. In this manner, foreign substances, such as dust, mixed in the compressed gas from the positive pressure source 14 are removed by the positive pressure-side filter element 51, thus it is possible to achieve vacuum break as well as prevention of discharge of the foreign substances from the adsorption pad 10.

As described above, in the filter device 1 according to an embodiment of the present invention, when a pressure inputted to the first port 20 is selectively switched between a negative pressure and a positive pressure, switching between the negative pressure-side and positive pressure-side filters 4, 5 for removing foreign substances from the gas flowing in the filter device 1 is made by the shuttle valve 7 which switches between communication states of three valve openings 70, 71, 72 by the single valve disc 76, thus it is possible to provide the filter device 1 having a more simple and logical flow path structure.

Although an embodiment of the filter device according to the present invention has been described in detail above, in the embodiment, the joints of the first and second ports 20, 30 may be replaced by the quick joints 25, 35 and a joint with a screw may be used, and the filter elements 41, 51 may also be replaced by tubular ones and cylindrical ones may be used.

REFERENCE SIGNS LIST

1 FILTER DEVICE
1a FIRST END

1b SECOND END
2 FIRST CAP SECTION
20 FIRST PORT
21 NEGATIVE PRESSURE-SIDE FITTING RECESS
22 POSITIVE PRESSURE-SIDE FITTING RECESS
23 CAP MAIN BODY
24 TUBULAR PROJECTION
25 QUICK JOINT
26 FIXING HOLE
3 SECOND CAP SECTION
30 SECOND PORT
31 NEGATIVE PRESSURE-SIDE FITTING RECESS
32 POSITIVE PRESSURE-SIDE FITTING RECESS
33 CAP MAIN BODY
34 TUBULAR PROJECTION
35 QUICK JOINT
36 FIXING HOLE
37 CONNECTION FLOW PATH
4 NEGATIVE PRESSURE-SIDE FILTER
40 NEGATIVE PRESSURE-SIDE FLOW PATH
41 NEGATIVE PRESSURE-SIDE FILTER ELEMENT
41a NEGATIVE PRESSURE-SIDE INSIDE FLOW PATH (INSIDE FLOW PATH)
42 NEGATIVE PRESSURE-SIDE FILTER CASE
43 NEGATIVE PRESSURE-SIDE RING-SHAPED OUTER FLOW PATH
44 NEGATIVE PRESSURE-SIDE FIRST JOINT
44a MAIN BODY
44b CONNECTION PORTION
44c FITTING PORTION
45 NEGATIVE PRESSURE-SIDE FIRST FLOW PATH
47 NEGATIVE PRESSURE-SIDE SECOND JOINT
47a MAIN BODY
47b CONNECTION PORTION
47c FITTING PORTION
47d FITTING PROJECTION
48 NEGATIVE PRESSURE-SIDE SECOND FLOW PATH
48a AXIAL FLOW PATH
48b RADIAL FLOW PATH PORTION
5 POSITIVE PRESSURE-SIDE FILTER
50 POSITIVE PRESSURE-SIDE FLOW PATH
50a CONSTRICTION PORTION
51 POSITIVE PRESSURE-SIDE FILTER ELEMENT
51a POSITIVE PRESSURE-SIDE INSIDE FLOW PATH (INSIDE FLOW PATH)
52 POSITIVE PRESSURE-SIDE FILTER CASE
53 POSITIVE PRESSURE-SIDE RING-SHAPED OUTER FLOW PATH
54 POSITIVE PRESSURE-SIDE FILTER FIRST JOINT
54a MAIN BODY
54b CONNECTION PORTION
54c FITTING PORTION
54d FITTING PROJECTION
55 POSITIVE PRESSURE-SIDE FIRST FLOW PATH
55a AXIAL FLOW PATH PORTION
55b RADIAL FLOW PATH PORTION
57 POSITIVE PRESSURE-SIDE SECOND JOINT
57a MAIN BODY
57b CONNECTION PORTION
57c FITTING PORTION
58 POSITIVE PRESSURE-SIDE SECOND FLOW PATH
6 FILTER MAIN BODY
7 SHUTTLE VALVE
70 FIRST VALVE OPENING
71 SECOND VALVE OPENING
72 THIRD VALVE OPENING
73 VALVE MOUNTING HOLE
74 VALVE CHAMBER
74a FIRST VALVE SEAT
74b FIRST CHAMBER
74c SECOND CHAMBER
74d GAP
75 BODY FOR FLOW PATH FORMATION
75a SECOND VALVE SEAT
75b TUBULAR OPENING
76 VALVE DISC
76a CHECK VALVE
76b POPPET VALVE
77 FIRST COMMUNICATION FLOW PATH
78 SECOND COMMUNICATION FLOW PATH
78a AXIAL FLOW PATH PORTION
78b RADIAL FLOW PATH PORTION
79 RING-SHAPED FLOW PATH
8 HOLDER
8a FIRST FITTING GROOVE
8b SECOND FITTING GROOVE
8c FIRST ENGAGEMENT GROOVE
8d SECOND ENGAGEMENT GROOVE
8e FIXING HOLE
9 BRACKET
90 PLATE FOR FIXATION
91 FIRST GRIP SECTION
91a, 91b FIRST GRIP ARM
92 SECOND GRIP SECTION
92a, 92b SECOND GRIP ARM
10 ADSORPTION PAD
11, 12 ELECTROMAGNETIC PILOT SWITCHING VALVE
13 NEGATIVE PRESSURE SOURCE (EJECTOR DEVICE)
14 POSITIVE PRESSURE SOURCE (COMPRESSOR)
15 FLOW PATH
L1 FIRST AXIS (AXIS)
L2 SECOND AXIS
S SEAL MEMBER

The invention claimed is:

1. A filter device which is installed in a flow path and filters foreign substances from a gas which flows through the flow path to which a pressure selectively switched between a negative pressure and a positive pressure is supplied, the filter device comprising:
a first port for selectively switching between and inputting a negative pressure and a positive pressure; a second port for outputting to an outside the negative pressure and the positive pressure inputted from the first port; and a negative pressure-side filter and a positive pressure-side filter which are disposed between the first port and the second port, and connected in parallel to the first and second ports,
the negative pressure-side filter has a breathable negative pressure-side filter element to filter foreign substances from a gas which flows from the second port to the first port, and the positive pressure-side filter has a breathable positive pressure-side filter element to filter foreign substances from a gas which flows from the first port to the second port,
a shuttle valve is disposed between the first port, and the negative pressure-side and positive pressure-side filters, and
the shuttle valve has a valve disc such that when a negative pressure is supplied to the first port, the valve disc opens communication between the first port and the negative pressure-side filter to output the negative pressure from the second port, and simultaneously blocks communication between the first port and the positive pressure-side filter, whereas when a positive pressure is supplied to the first port, the valve disc opens communication between the first port and the positive pressure-side filter to output the positive pressure from the second port, and simultaneously blocks communication between the first port and the negative pressure-side filter.

2. The filter device according to claim 1,
wherein the filter device has a negative pressure-side flow path including the negative pressure-side filter and a positive pressure-side flow path including the positive pressure-side filter between the first port and the second port, and
one ends of the negative pressure-side flow path and the positive pressure-side flow path communicate with the shuttle valve, and the other ends of the negative pressure-side flow path and the positive pressure-side flow path communicate with the second port.

3. The filter device according to claim 2,
wherein a constriction portion is formed on a flow path portion in the positive pressure-side flow path, the flow path portion being closer to the second port than to the positive pressure-side filter element.

4. The filter device according to claim 2,
wherein the filter device extends along a longitudinal axis, and has a first end and a second end at both ends in an axial direction,
the filter device has a filter main body which includes the negative pressure-side and positive pressure-side filters and extends in the axial direction, a first cap section which includes the first port and the shuttle valve, and is detachably attached to an end on a first end side of the filter main body, and a second cap section which includes the second port, and is detachably attached to an end on a second end side of the filter main body,
the negative pressure-side and positive pressure-side filters are provided extending in parallel to each other in the axial direction in the filter main body, and
both ends of the negative pressure-side and positive pressure-side filters are detachably connected to the first cap section and the second cap section, and thereby ends on a first end side of the negative pressure-side flow path and the positive pressure-side flow path communicate with the shuttle valve, and ends on a second end side of the negative pressure-side flow path and the positive pressure-side flow path communicate with the second port.

5. The filter device according to claim 4,
wherein the negative pressure-side filter has the negative pressure-side filter element in a tubular shape extending in the axial direction, a tubular negative pressure-side filter case which inwardly houses the negative pressure-side filter element and forms a negative pressure-side ring-shaped outer flow path on an outer circumferential surface of the negative pressure-side filter element, a negative pressure-side first joint that connects an end on a first end side of the negative pressure-side filter case and the first cap section, and a negative pressure-side second joint that connects an end on a second end side of the negative pressure-side filter case and the second cap section,
in the negative pressure-side first joint, a negative pressure-side first flow path is formed, which allows the shuttle valve and an internal flow path of the negative pressure-side filter element to communicate with each other in the negative pressure-side flow path, and in the negative pressure-side second joint, a negative pressure-side second flow path is formed, which allows the negative pressure-side ring-shaped outer flow path and the second port to communicate with each other in the negative pressure-side flow path,
the positive pressure-side filter has the positive pressure-side filter element in a tubular shape extending in the axial direction, a tubular positive pressure-side filter case which inwardly houses the positive pressure-side filter element and forms a positive pressure-side ring-shaped outer flow path on an outer circumferential surface of the positive pressure-side filter element, a positive pressure-side first joint that connects an end on a first end side of the positive pressure-side filter case and the first cap section, and a positive pressure-side second joint that connects an end on a second end side of the positive pressure-side filter case and the second cap section, and
in the positive pressure-side first joint, a positive pressure-side first flow path is formed, which allows the shuttle valve and the positive pressure-side ring-shaped outer flow path to communicate with each other in the positive pressure-side flow path, and in the positive pressure-side second joint, a positive pressure-side second flow path is formed, which allows an internal flow path of the positive pressure-side filter element and the second port to communicate with each other in the positive pressure-side flow path.

6. The filter device according to claim 5,
wherein a constriction portion is formed in a flow path portion, which is closer to the second port than to the positive pressure-side filter element, in the positive pressure-side flow path by setting an effective cross-sectional area of the positive pressure-side first flow path equal to an effective cross-sectional area of the negative pressure-side second flow path, and an effective cross-sectional area of the positive pressure-side second flow path smaller than an effective cross-sectional area of the negative pressure-side first flow path.

7. The filter device according to claim 5,
wherein the negative pressure-side filter case and the positive pressure-side filter case are formed of a transparent material so that the negative pressure-side filter element and the positive pressure-side filter element are visible from an outside through the negative pressure-side and positive-side filter cases.

8. The filter device according to claim 4,
wherein the shuttle valve has a valve mounting hole which is provided open in the first cap section, a body for flow path formation which is fitted into the valve mounting hole and forms a valve chamber between a leading end and a bottom of the valve mounting hole, and the valve disc disposed in the valve chamber,
a first communication flow path, which communicates with the negative pressure-side flow path, is provided open on a bottom side than the valve disc of the valve mounting hole, and a ring-shaped first valve seat is formed on an inner circumferential surface around an opening of the first communication flow path in the valve chamber, the first valve seat being brought into contact with and separated from the valve disc,
a second communication flow path, which communicates with the positive pressure-side flow path, is formed at a leading end of the body for flow path formation, and a ring-shaped second valve seat is formed around an opening of the second communication flow path, the second valve seat being brought into contact with and separated from the valve disc, the first port communicates with a sectional part on a second valve seat side than the valve disc in the valve chamber, and when a negative pressure is applied to the first port, the valve disc is separated from the first valve seat and is seated on the second valve seat, and when a positive pressure is applied to the first port, the valve disc is seated on the first valve seat and is separated from the second valve seat.

\* \* \* \* \*